United States Patent [19]
Alimanestianu et al.

[11] 3,918,665
[45] Nov. 11, 1975

[54] RAILROAD TYPE SWITCH

[75] Inventors: Mihai Alimanestianu; Nicholas M. Alimanestianu, both of Upper Nyack, N.Y.

[73] Assignee: Mihai Alimanestianu, Upper Nyack, N.Y.

[22] Filed: Jan. 30, 1974

[21] Appl. No.: 438,021

[52] U.S. Cl. ............... 246/415; 104/130; 246/446
[51] Int. Cl.² ......................................... E01B 7/00
[58] Field of Search .................. 104/130, 131, 132; 246/415, 392, 382, 383, 354, 355, 356, 415, 445, 446

[56] References Cited
UNITED STATES PATENTS

| | | | |
|---|---|---|---|
| 2,011,798 | 8/1935 | Davis | 246/446 |
| 3,093,090 | 6/1963 | Rosenbaum | 104/130 |

*Primary Examiner*—Lloyd L. King
*Assistant Examiner*—Richard A. Bertsch
*Attorney, Agent, or Firm*—Pasquale A. Razzano; Harold L. Stults; Curtis, Morris & Safford

[57] ABSTRACT

A tracked vehicle switch assembly is operatively connected between a single main track and a pair of diverging tracks for selectively diverting a vehicle moving along the main track to one of the diverging tracks. The switch assembly includes first and second track sections having first abutting ends, and second ends respectively connected to the main track and the pair of diverging tracks. The first track section is thus a continuation of the main track, while the second track section is a continuation of the pair of diverging tracks. The abutting ends of the first and second track sections are operatively connected to a moving device which simultaneously moves these ends in opposite directions between two extreme positions, in substantially the same plane, thereby to selectively align the first track section with the tracks of the second track section in order to selectively direct a vehicle on the main track to either of the diverging tracks.

27 Claims, 12 Drawing Figures

Fig. 2

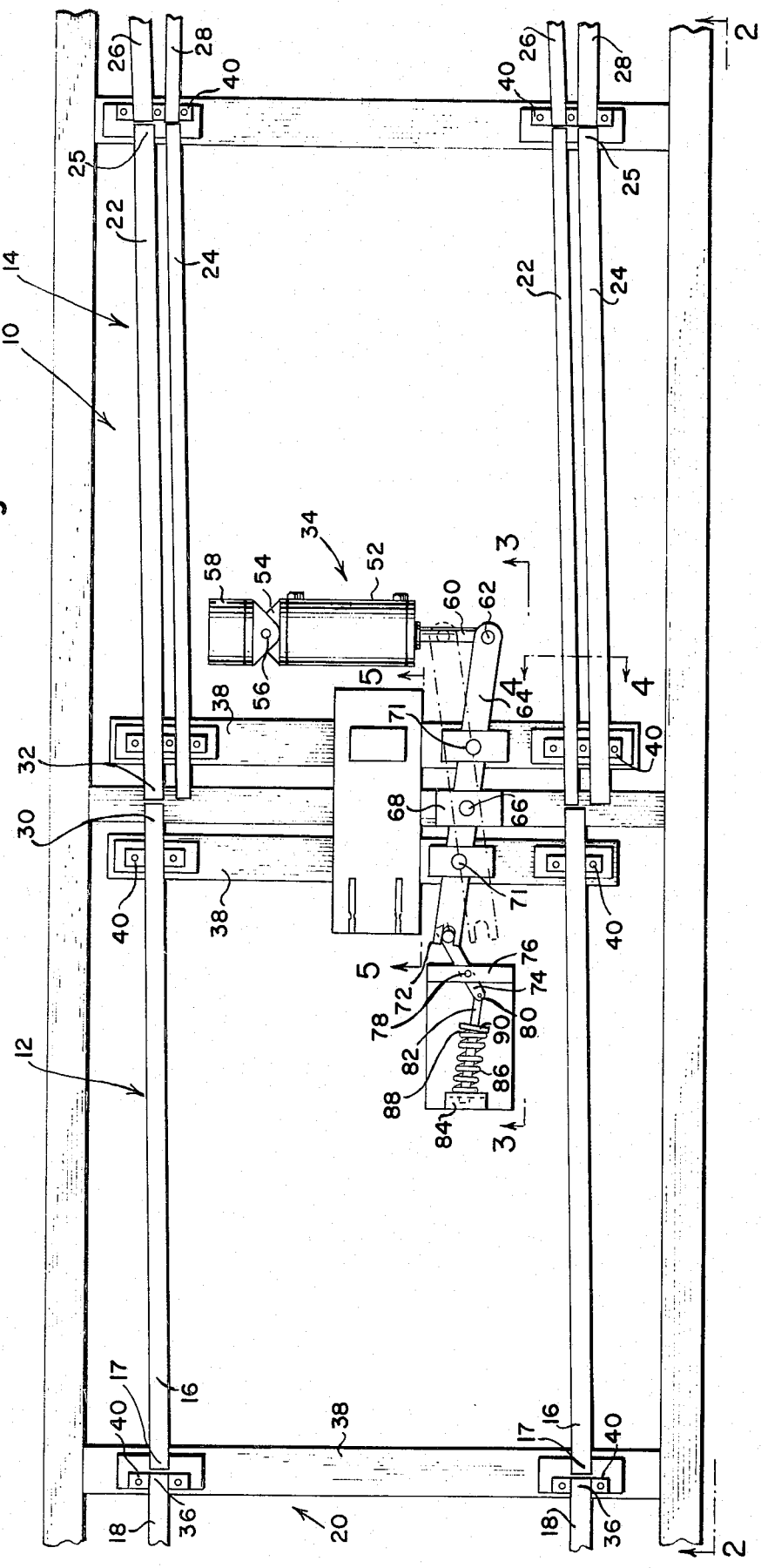
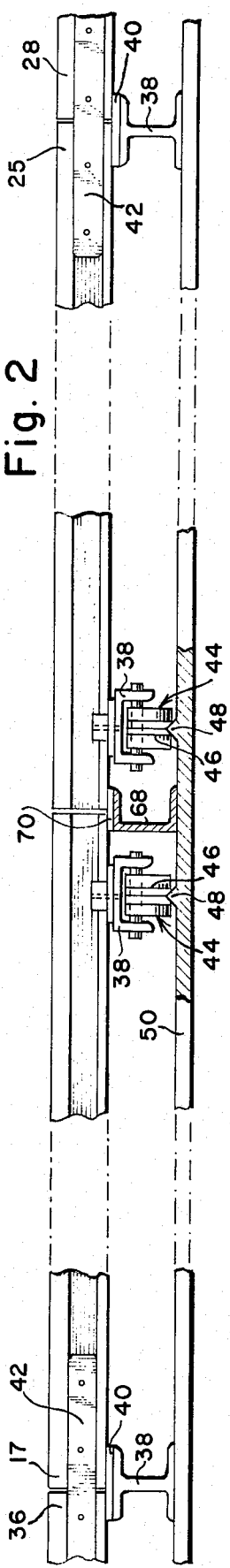
Fig. 1
Fig. 2

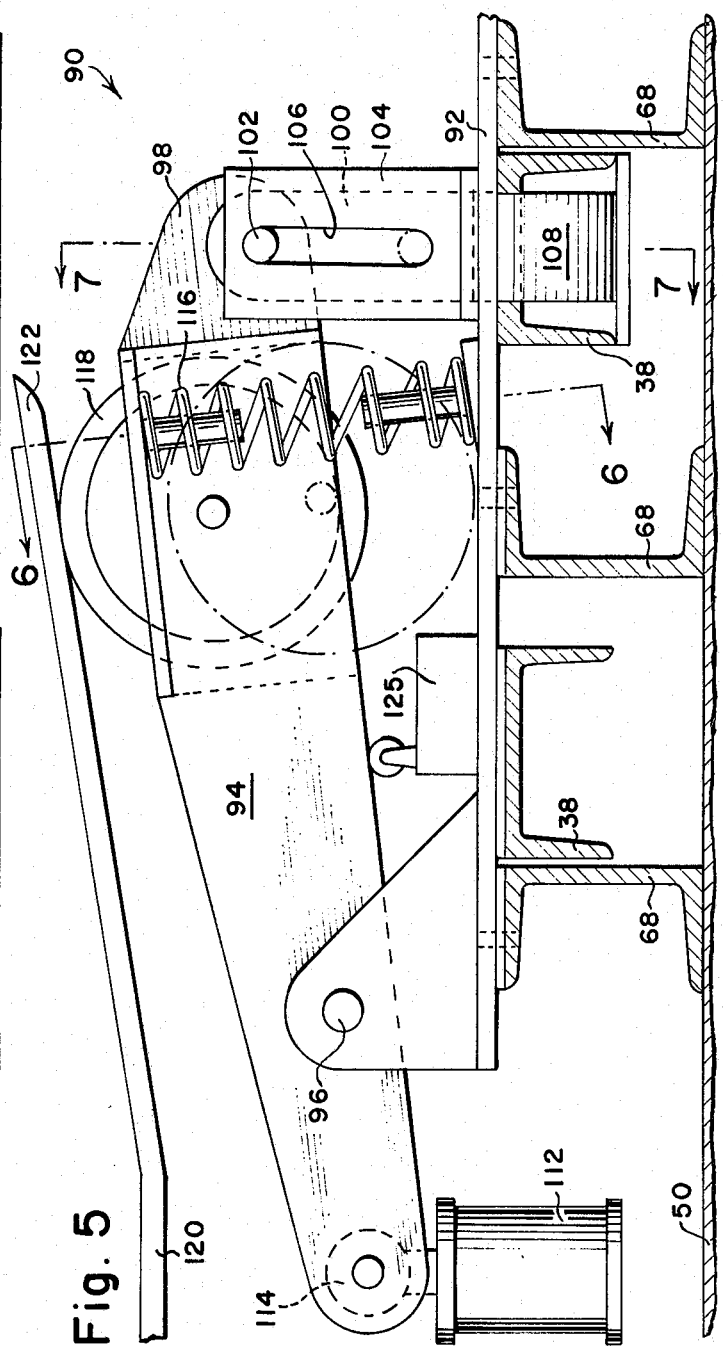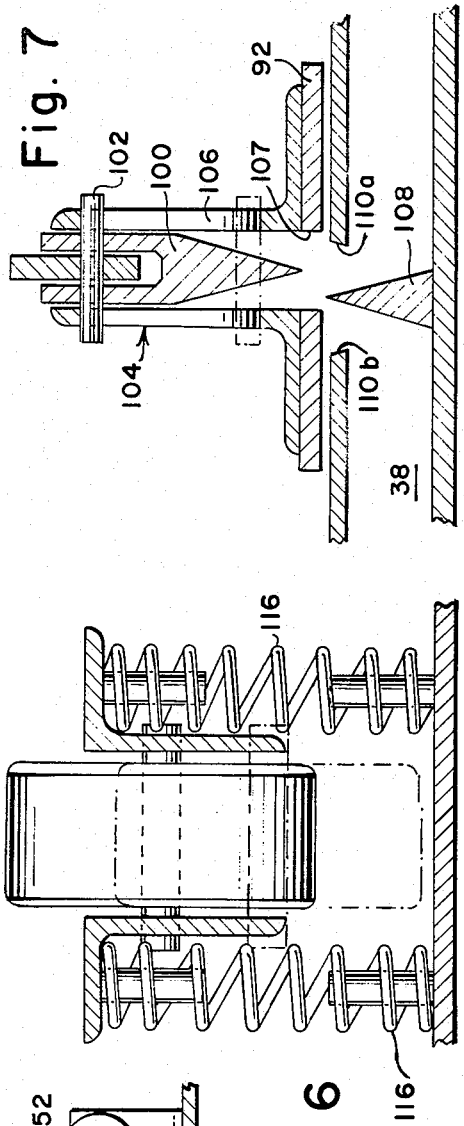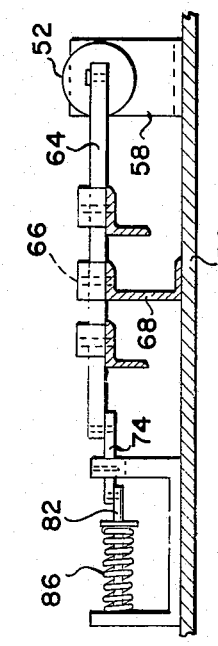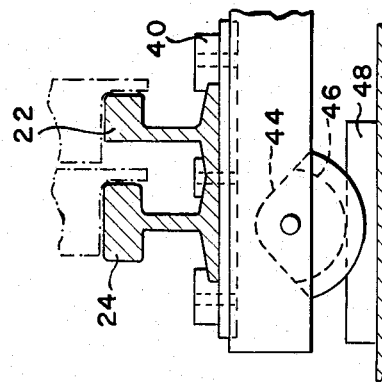

RAILROAD TYPE SWITCH

The present invention relates to tracked vehicle switches and, more particularly, to a railroad type switch which is adapted to be operated, even with a vehicle passing on a moving portion thereof.

Tracked vehicle switches, particularly of the railroad type in which one section of track is moved with respect to other sections of track, are well known and many modifications and improvements have been made therein since the invention of the railroad. However, such movable track switches are relatively large in construction and slow in operation. Thus, they have not been found to be entirely suitable for use in more modern rapid transit transportation systems.

Typically, previously proposed switching assemblies must be switched well in advance of the approach of the vehicle or train to the switch assembly so as to be certain that the switching movement is completed before the train or vehicle moves onto the moving track. Thus, an inordinate amount of time is used in order to switch the vehicle from one track to another, thereby increasing the lag time required between successive vehicles passing over the switch assembly, with the result that the number of vehicles that can pass over the switch in a given amount of time is critically limited. The limitation placed on the transit system by the time required for the operation of conventional systems thus also substantially reduces the passenger capacity of the transit system.

In addition to these problems, conventional railroad type switches have rails or rail members including a "tongue" which is moved into and out of position adjacent to a fixed rail, in order to switch a train or car. The positioning of the tongue of the switch in side by side relation to the fixed rail is often hampered by jamming since a rock, or other foreign object can become wedged in between the tongue and rail, preventing the switch from closing properly.

Accordingly, it is an object of the present invention to provide a substantially jam-proof and fail safe switch assembly.

Another object of the present invention is to rapidly switch closely following vehicles between diverging pairs of tracks in a switching assembly.

Another object of the present invention is to provide a switching assembly in which closely spaced vehicles are rapidly switched between selected pairs of tracks.

Yet another object of the present invention is to provide a tracked vehicle switching assembly which is relatively rapid in operation and durable in construction.

A still further object of the present invention is to provide a track vehicle switching assembly which is substantially fail safe.

In accordance with one aspect of the present invention, a tracked vehicle switch assembly for use in a railroad type transportation system is connected between a single main track, defined by a pair of railroad type rails, and a pair of diverging tracks, defined by two pairs of diverging railroad type rails. The assembly is adapted to selectively divert a vehicle moving along the single main track to a selected one of the pairs of diverging tracks with a relatively rapid switch movement, so that the vehicle is rapidly switched and the switch can immediately be operated to switch a following vehicle to the other track in the diverging pair.

Basically, the switching assembly consists of two generally longitudinally aligned movable track sections having abutting end portions. The first track section consists of a pair of parallely extending rails operatively connected to the respective rails of the main track. The second track section consists of two pairs of parallely extending rails operatively connected to the respective rails of the pair of diverging tracks. The abutting ends of the track sections in the switch assembly are operatively connected to a hydraulic or pneumatic ram, or the like, which selectively and simultaneoulsy moves the abutting end portions of the tracks in opposite directions and in substantially the same plane, thereby to selectively align the rails in the first track section with the rails of the selected pair of rails in the second track section. In this manner, the two moving rail sections divert a vehicle traveling along the main track onto a selected pair of rails of the second track section and thus onto one of the pairs of diverging tracks in the transit system. In addition, because the ends of the switch rails are in abutting relation, they cannot be jammed by rocks or foreign objects as occurs with conventional switches. Moreover, the relative movement of the abutting rails ends provides a shearing action which clears the rail ends of any foreign object during switching so that proper alignment is achieved.

As will appear hereinafter, various sensing and control apparatus are provided in the switching assembly so that the track sections of the assembly cannot be moved until a vehicle spanning the abutting ends of the track sections in the assembly has passed those ends onto the second track section. Since both sections of the switch assembly are moved, in opposite directions, the time required for the switching operation to take place is substantially reduced, and each track section is moved through only a relatively small distance. As a result, once a vehicle crosses the abutting ends of the track sections in the assembly, the switch assembly can be operated to move the track sections in an opposite direction to switch an immediately following vehicle.

The above, and other objects, features and advantages of the present invention, will be apparent in the following detailed description of an illustrative embodiment of the invention which is to be read in connection with the accompanying drawings, wherein:

FIG. 1 is a plan view of a switching assembly constructed in accordance with an embodiment of the present invention;

FIG. 2 is an enlarged partially broken away elevational view of the switching assembly taken along lines 2—2 of FIG. 1;

FIG. 3 is a sectional view taken along line 3—3 of FIG. 2 showing the track moving mechanism;

FIG. 4 is a sectional view taken along line 4—4 of FIG. 1 showing the rail support at the abutting ends of the track sections in the assembly;

FIG. 5 is an elevational view, taken along line 5—5 of FIG. 1 showing a locking mechanism for locking the rails in their switched position;

FIG. 6 is a sectional view taken along line 6—6 of FIG. 5;

FIG. 7 is a sectional view taken along line 7—7 of FIG. 5; and

Figure 8:
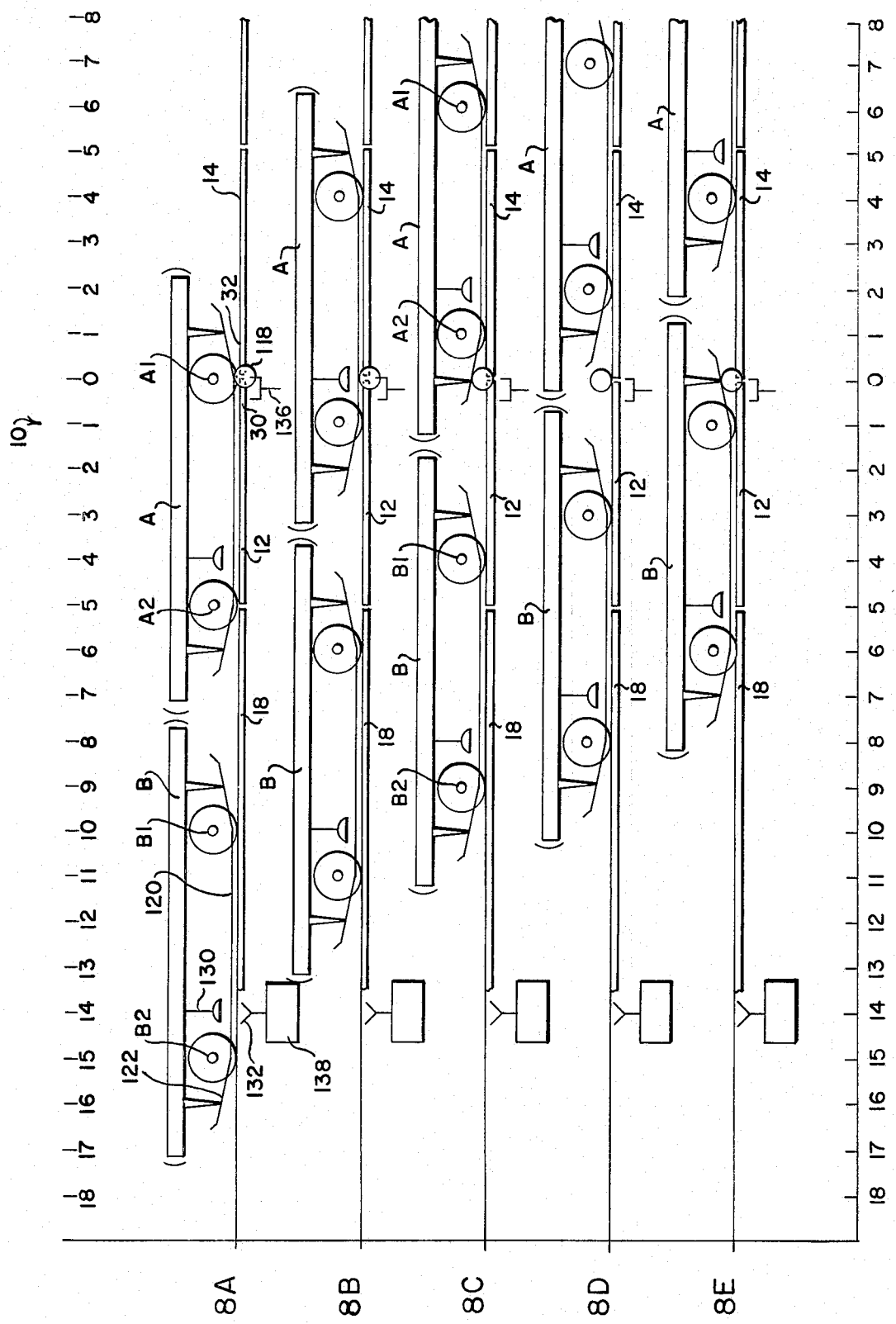
FIGS. 8A–8E are successive schematic elevational views illustrating the movement of a pair of vehicles over the switching assembly of the present invention.

Referring now to the drawing in detail and initially to FIG. 1 thereof, it will be seen that a switching assembly 10, constructed in accordance with the present invention includes a first movable track section 12 and a second movable track section 14. Track section 12 comprises a pair of railroad type rails 16 which are flexibly connected to the rails 18 of main track section 20, in a railroad type transit system. Track section 14, on the other hand, consists of two pairs of parallely extending rails 22, 24 which are flexibly connected at their ends 25 to respective pairs of diverging rails 26, 28, which in turn respectively define a continuation of the main track 18 and a spur track.

The abutting ends 30, 32 of track sections 12, 14 respectively are movable in opposite directions upon operation of an actuating mechanism 34 in order to selectively align rails 16 with the rails 22 or 24, thereby to direct a vehicle traveling along main track 18 onto either the pairs of rails 22 or 24, and thus onto the continuation of the main track 26 or the spur defined by rails 28.

The rails 18 of the main track section 20 are secured at their ends 36 to a tie 38, as seen in FIG. 2, by welding so as to form a rigid connection to the tie. An intermediate tie plate 40 may be used to mount the rail on the tie with the rail being welded to the tie plate and the tie plate welded or bolted to the tie. The ends 17 of rails 16, are in turn flexibly connected to the ends 36 of rails 18 by plates 42 secured to the ends of the rails, by bolts or the like, as also illustrated in FIG. 2. The plates 42, while firmly interconnecting the rails 16 and 18, permit rails 16 to be moved or pivoted with respect to rails 16 by flexing when the opposite ends 30 of rails 16 are pivoted by operating mechanism 34.

The ends 30 of rails 16 are secured, in any convenient manner, as for example by tie plates 40 to a transverse tie member 38. This tie member has a roller 44 rotatably mounted thereon, as seen in FIG. 2, to support the ends 30 of the rails 16 during movement thereof. In one embodiment of the invention, rollers 44 are section rollers, of the type illustrated in FIG. 4, having a peripheral groove 46 formed therein which is adapted to receive a guide angle 48 mounted in the bed 50 of the transit system. This arrangement reduces friction in the system during movement of rails 16, as described hereinafter, and also serves to guide the movement of the rails over a predetermined path of travel.

Rails 22, 24 of track section 14 are respectively connected to the rails 26, 28 by plates 42, in the same manner as previously described with respect to the rails 16. In addition, rails 26, 28 are secured to a tie 38 by welding to tie plates 40, in the same manner as previously described with respect to rails 16. In this manner, plates 42 also permit rails 22, 24 to be moved or pivoted with respect to rails 26, 28 when the rail ends 32 of track section 14 are moved by moving mechanism 34.

The ends 32 of track section 14, i.e. the ends 32 of each of the rails 22, 24 are mounted on a transverse tie 38 by tie plates 40, in the same manner as the ends 30 of rails 16. In addition, this tie also has mounted thereon grooved rollers 44 which are seated on an angle 48.

The roller mounting for one of the ends 32 of rails 22, 24 is shown in FIG. 4, wherein the rails are illustrated in greater detail along with their tie plates 40. Since the movement of the rails during operation of the switching assembly is limited to a relatively small distance the rollers 44 utilized to support the ends of the rails need not be full rollers, but can be sectioned rollers as seen in FIG. 4. In addition, the angles 48, mounted on bed 50, need be relatively short to accommodate only the limited movement of the rollers during the actuation of the switch assembly by the mechanism 34. It is noted that the movement of both rail sections 12 and 14, during actuation of the switch assembly, is a relatively arcuate movement with the rails essentially pivoting about their connections to the rails 18, 26, 28, by flexure of the plates 42 and the rails themselves. This limited arcuate movement of the ends 30, 32 of rails 16, 22, 24 is accommodated by the groove arrangement in the rollers, but is so slight as to be essentially straight.

Actuating mechanism 34, which selectively moves the ends 30, 32 of the rail sections 12, 14 includes a pneumatic ram 52 which extends generally parallel to bed 50 of the switch assembly, as seen in FIG. 3, with the end 54 of its cylinder housing pivotally connected at 56 to a support plate 58 extending vertically upwardly from bed 50. The actuator rod 60 of ram 52 is pivotally connected at 62 to a lever 64. The latter is pivotally mounted intermediate its ends at 66, in any convenient manner, on a transverse support channel 68. Support channel 68 also has support pads 70 mounted thereon, in any convenient manner, which may be formed of steel or low friction plastic, for supporting the extreme free ends of the rails in the switch assembly, as seen in FIG. 2.

Lever 64 is pivotally connected to the ties 38, respectively connecting the ends 30, 32 of track sections 12, 14. The pivotal connections 70 between the ties and lever 64 are located on opposite sides of pivot 66 and may be formed of substantially the same construction as pivot 66, in any convenient manner. By this arrangement, it will be appreciated that actuation of ram 52 will cause lever 64 to oscillate about pivot point 66, between the two positions respectively illustrated in solid and dotted lines in FIG. 1, as determined by the length of the stroke of the actuator rod 60. As a result of such oscillation the ends 30, 32 of the track sections 12, 14 are moved in opposite directions.

The length of the stroke of actuator rod 60 is selected such that in one extreme position thereof, for example, the position illustrated in solid lines in FIG. 1, rails 16 of track section 12 align with rails 22 of track section 14, so that a vehicle moving along main track 18, from the left to the right in the drawing of FIG. 1, will be directed from the main track onto the rails 26 while, in the other position of lever 64, illustrated in dotted lines, the ends 30 of the rails in track section 12 will be aligned with the ends 32 of rails 24, so that a vehicle on the main track will be directed onto rails 28.

It is noted that the switching assembly of the present invention is primarily intended to be used with railroad type vehicles having flanged metal wheels so that the rails of the switch assembly can be conventional railroad type rails, as seen in FIG. 4. In this connection, in the track section 14, one side of each of the two inner rails 24, 22 in track section 14 are for shortened, as seen in FIG. 4, for example, in order to allow space for the flange of the wheel traveling on the outer track section. This is conventional construction for railroad type rails at a switch.

In order to insure that lever 64 is moved to its extreme positions to properly align the ends 30, 32 of the respective track sections, the other end 72 of lever 64 is pivotally connected to a toggle 74, mounted in a vertically extending frame member 76 on bed 50. Toggle 72 is pivotally mounted at 78 in frame member 76 and pivotally connected at its end 80 to a rod 82. The latter is, in turn, pivotally mounted on a second upstanding frame member 84 and is surrounded by a coil spring 86 which is engaged at one end against plate 84 and at its opposite end 88 with an abutment disk 90 secured to the rod 82. In this manner spring 86 provides an over the center type biasing force on the lever 74. Accordingly, as lever 64 is moved from one position to another, once the lever passes its center point, i.e. the point wherein the pivots 66, 70, 78 are in alignment, spring 86 will urge lever 64, through toggle 74, in the direction of movement of the lever. Accordingly, even if actuator rod 60 of ram 52 is not fully extended, for example due to a failure in the pneumatic supply to the ram, or if the ram extends too slowly, once the lever 64 has passed its center point it will be rapidly moved by spring 86 into the extreme position to which it was being moved by the ram, thereby insuring that the ends 30, 32 of the track sections are rapidly and properly aligned in the desired position.

In order to further insure proper positioning of the track ends 30, 32 and to provide a fail safe system in the track assembly of the present invention, a locking mechanism 90 is provided adjacent the abutting ends of the switch assembly. This mechanism, as shown most clearly in FIGS. 5–7 of the drawing, includes a plate 92 supported on the channel support member 68 and auxiliary support channels 68 mounted on bed 50 at opposite sides of the ties 38 supporting the ends 30, 32 of track sedtions 12 and 14. A lever 94 is pivotally mounted at 96 on plate 92 and has at its end 98 a projection bar 100 secured thereto in any convenient manner, as for example by a pivot pin 102 (see FIG. 7). Projection 100 is positioned to slide between a pair of guide plates 104 having slots 106 formed therein which receive the free ends of the pivot pin 102 to guide the movement of projection 100 upon oscillation of lever 94.

Projection 100 is located over an opening 106 in support plate 92, which opening is positioned above a locking wedge or block 108 mounted in the tie 38 of track section 14. Locking wedge 108 has a pair of inclined surfaces 110a, 106 formed thereon which have a configuration that is complementary to the configuration of the projection 100. Surfaces 100a are located to correspond substantially to the extreme positions of lever 64. That is, when lever 64 is in its solid line position of FIG. 1, surface 100a of projection 100 can be placed in mating relation to surface 110a. On the other hand, when lever 64 is in its solid line position surface 100b can be placed in mating relation with surface 110b. In this manner, once track section 14 is moved by the mechanism 34 projection 100 can be moved downwardly, upon oscillation of lever 94, to engage a projection 100 against the appropriate surface of wedge 110. By this construction, in the event that track section 14 is not moved completely to its proper end position, the insertion of projection 100 through recess 107 therebelow will cause one side of the projection to engage or cam against the appropriate surface 110a, 110b and urge the track section into its proper position by the camming action between the surfaces. This movement of the tie of track section 14 will of course cause equal and opposite movement of the tie of track section 12, because of their pivotal interconnection by the lever 64.

Operation of lever 94 is controlled by a pneumatic ram or actuator 112, operatively connected to the end 114 of lever 94 in any convenient manner. Normally, ram 112 maintains lever 94 in its down position, i.e. with projection 100 properly mated with wedge 110, in order to keep the track sections 12, 14 locked in a fixed position at all times, except when the tracks are to be moved. Ram 112 is controlled, in a manner more fully described hereinafter, so that when the ram 52 is to be actuated to move the track sections, ram 112 is simultaneously actuated to pivot lever 94 in a relatively counter-clockwise direction thereby to withdraw projection 100 from recess 107 in which it had previously been inserted. Thereafter, the operation of the ram 112 is automatically reversed to rotate lever 94 in the opposite direction to again depress the projection. By the time the projection again moves downwardly tie 38 of track section 14 has been moved a sufficient distance by ram 52 so that the other surface of projection 100 will engage the opposite surface of wedge 110; thus projection 100 will engage the proper cam surface to properly position the track sections.

As yet another fail safe feature of the present invention, the locking mechanism is provided with means for controlling the operation and insertion of projection 100 even if the pneumatic control system of the switch assembly should fail. Thus, lever 94 is operatively connected between a pair of springs 116, on opposite sides thereof, as seen in FIG. 6, which springs bias the lever in a counterclockwise direction, limited by the engagement of the pivot pin 104 against the upper end of slot 106. Thus, in the event that actuator 112 should fail, springs 116 keep the projection 100 out of recess 107, permitting the track sections to be moved by ram 52 when desired. However, in order to lock the track assembly during passage of a vehicle over the switch assembly, and particularly over the abutting ends of the two track sections, even if ram 112 should fail, lever 94 is provided with a cam roller 118 mounted thereon adjacent its upper edge for cooperation with a ski 120 mounted in any convenient manner on the lower body portion of the vehicles using the transit system incorporating the switching assembly of the present invention. Such vehicles are illustrated schematically in FIG. 8 wherein it is seen that ski 120 is suspended below the carriage portion of the vehicles, between the front and rear wheels. Each ski includes a front and rear inclined portion 122 which, as seen in FIG. 5, acts as a camming surface against roller 118 as the vehicle approaches locking mechanism 90. Thus, if for some reason pneumatic ram 112 should fail, lever 94 will normally be in its raised position under the influence of spring 116. However, when a vehicle approaches the abutting ends of the track sections in the switch assembly the leading end portion 122 of its ski 120 engages roller 118, thereby progressively pivoting the lever 94 downwardly to insert the projection 100 in recess 107 and against one of the surfaces 110 to properly position the rails. The ski holds the lever down in this manner, until the rear wheels of the vehicle have crossed the gap between the abutting end portions of the track sections in the swtich assembly. At that point, the trailing end 122 of the ski permits the lever 94 to be gently moved upwardly, by springs 116, so as to permit the track assembly to be thereafter moved by ram 52. Accordingly, it is seen that by the construction of the locking mechanism, it is impossible for the track assembly to be operated while a vehicle spans the two sections of track in the assembly. Moreover, the track sections are locked in position since movement is limited in one direction by the wedge 108 and in the other direction by the extreme position of the piston in ram 52.

As yet another feature of the invention, a cut off swtich 125 is provided at locking mechanism 90 to determine the position of lever 94. The cut off switch controls the controlling circuitry for ram 52, so as to prevent actuation of ram 52 when lever 94 is depressed by the ski on a vehicle straddling the gap between the ends of the track sections in the switch. This cut off switch thereby avoids damage to the switch assembly should a signal to ram 52 to switch the tracks be sent to the ram while a vehicle is straddling the switch assembly. However, it is noted that even without cut off switch 125, the track sections could not be moved while lever 94 is depressed by the ski on a vehicle on the switch assembly, even if ram 52 is actuated, because of the engagement of the projection 100 in the recesses of locking block 108.

Having described the structural features of applicants' invention, the sequence of operation of the track assembly, and additional details relating to the control of the various mechanical operating mechanisms, may now be described with particular reference to FIGS. 1, 5 and 8. Each of the figures in FIG. 8 represents a different stage in the operation of the switch assembly. The scale above FIG. 8A represents units of distance and time, with each unit being equal to approximately 1 foot and approximately 30 milliseconds, in accordance with one embodiment of the present invention. The zero point on the scale represents the gap between the abutting ends 30, 32 of track sections 12 and 14.

For illustrative purposes herein, it is assumed that the switch assembly is in the condition shown in solid lines in FIG. 1, with rails 16 aligned with the rails 22 of track section 14, and with a first vehicle A having its front wheels $A_1$ just crossing the gap between the ends 30, 32 of the track sections in the switch. In addition, it is assumed that a second vehicle B is trailing directly behind vehicle A, in substantially bumper to bumper relationship, as shown in FIG. 8A. In this configuration, ram 52 has previously been actuated to properly align the track sections 12 and 14, so as to direct vehicle A along the rails 22 in track section 14 and onto the rails 26.

The destination of a vehicle is predetermined by the operator of the vehicle, or by the passengers where no operator is present, and entered into an electronic memory (not shown) in the vehicle. The destination in the vehicle memory is electronically displayed or represented in an electronic destination indicator 130 mounted in the vehicle in any convenient manner. The indicator 130 may be of conventional construction and, for example, may simply represent the destination by a series of magnetic codes or dots formed on a surface portion thereof. This destination is read by a conventional electronic destination reader 132 which is located upstream from switch assembly 10 in the direction of travel of the vehicles along main track 18. The electronic destination reader reads the destination displayed or represented on the indicator 130, for example by detecting the magnetic code on the indicator, and forms an electronic signal which controls a solenoid valve or the like for controlling the supply of air to double acting cylinder 52, on the appropriate side of the cylinder, to move the piston therein in the proper direction. Thus, for example, if the destination stored in indicator 130 of vehicle B is to the spur tracks 28, the destination reader produces a signal causing air to be supplied to ram 52 on the side thereof which will move lever 64 into the dotted line position shown in FIG. 1. In the illustrative case, however, the vehicle A is already on the track assembly, and is passing across the gap between track ends 30, 32. Thus, the tracks are locked against movement by the depression of lever 94 under the influence of ram 112 and/or ski 120 of vehicle A, as described above, so that projection 100 is inserted in the locking block 108.

Although the movement of the track assembly under the influence of ram 52 would be prevented by this locking arrangement, it is still necessary to avoid loss of the signal produced by the destination reader while Vehicle A is spanning the track sections. Thus, an electronic presence senser 136 is provided at the gap between track section ends 30 and 32 to sense the presence of a vehicle spanning the gap between the ends of the track section and to intercept the signal from the destination reader and return it to a destination signal storage memory 138. The electronic vehicle presence sensor may be of conventional construction, such as for example a magnetic detector which could detect the presence of the straight portion of the ski 120 above the gap between the ends of the track sections. This presence sensor is in addition to the cut off switch 125 previously desribed above and is a redundant fail safe mechanism to that switch.

Thus, the signal from the destination reader representing the destination of vehicle B is intercepted before actuation of ram 52, by both the presence sensor 136 and cut off switch 125; the presence sensor detecting the presence of the vehicle electronically, and the cut off switch detecting the presence of the vehicle mechanically. Accordingly, if either of these sensors fail, the other will still operate to store the signal read by the destination reader 132 in the signal storage memory 138.

After the vehicle A crosses the gap between track ends 32, as for example when it enters the position shown in FIG. 8C, the electronic presence sensor and also the cut off switch 125, permit the signal in storage memory 138 to activate ram 52 thereby to move the track sections 12, 14 in opposite directions so that rails 16 will be aligned with the rails 24. Simultaneously, the signal from the destination reader or the signal which is stored in the storage memory 138, is also sent to ram 112, to actuate the ram and move lever 94 into its up position to free the track sections for movement by ram 52. As previously mentioned, however, in the event of a failure of the electronic system or the pneumatic actuator 112, lever 94 would be moved upwardly under the influence of springs 116 once the preceding vehicle reaches the position shown in FIG. 8C, thereby permitting the ram 52 to move the track sections.

The length of the track sections 12, 14 is selected to be substantially equal to the wheelbase of the vehicles used in the transit system. Thus, as seen in FIG. 8A, the length of track section 12 is equal to the distance between the wheels $A_1$, $A_2$ of vehicle A. Track sections 14 are similarly dimensioned.

Accordingly, once vehicle A reaches the position illustrated in FIG. 8C, the front wheels $A_1$ are on the rails 26, while the rear wheels $A_2$ are still on track section 14; similarly the front wheels $B_1$ of vehicle B are on track section 12 and the rear wheels $B_2$ thereof are still on the main track 18. It is at this point that the ram 52 is operated to move track sections 12 and 14 with respect to one another. Thus, it is seen that the rear and front wheels of vehicles A, B respectively are moving laterally with the track sections during the switching operation. This movement of the wheels and vehicles with the switch sections is permissible in the present invention because the horizontal movement is relatively slight as a result of the fact that the two sections of the switch are moved in opposite directions. Thus, for example, in one embodiment of the present invention where the gage of the tracks is 36 inches, and the wheelbase of the vehicles are 60 inches, each of the ends 30, 32 of the track sections need be moved laterally only approximately 1 and ⅜ inches in order to change the alignment of tracks 16 from tracks 22 to tracks 24. This relatively slight movement does not disturb the vehicle or the passengers thereon, even though one pair of wheels of each of the vehicles are on moving tracks. Of course, downstream of switch assembly 10 in the direction of travel of the vehicles a conventional railroad frog is provided between ends 26, 28 to permit the vehicles to cross over the diverging rails.

It is contemplated that the time taken for the track sections to be moved to proper alignment with one another would be approximately the time taken for vehicle B to travel from the position shown in FIG. 8C to the position shown in FIG. 8E, i.e. approximately 90 milliseconds. At that point, i.e. in the configuration of FIG. 8E, the tracks have reached their at rest position with tracks 16 aligned with tracks 24. As previously described, in order to insure proper alignment of the tracks, several fail safe features are provided in the present invention. For example, the toggle link arrangement 74 cooperates with lever 64 so as to spring bias the lever into the extreme position to which it is being moved by the ram 52. Similarly, the locking mechanism 90 previously described also acts to insure that the track sections are properly aligned, since, when the lever 94 is depressed the projection 100 is inserted through recess 107 into engagement with wedge 110 to cam the tie 38, and thus the track sections, into proper alignment. It is noted that although pneumatic ram 112 is operated to raise the projection 100 when the signal to ram 52 is released to operate the ram, the ram 112 is almost immediately reversed to again depress projection 100. By the time the projection again moves dowardly, tie 38 has been moved sufficiently by ram 52 so that projection 100 will engage the opposite side of wedge 110. Thus, movement need be only a slight distance since wedge 110 has a very thin tip 111. Thus, only a minimum movement of tie 38 is required to change the side of wedge 110 which will be engaged by depression of projection 100. Accordingly, even if the pneumatic actuator 112 does not properly operate, projection 100 is still depressed by the cooperation between the roller 118 and ski 120 of the vehicle. Since the ski 120 projects in front of the front wheels of the vehicle, the locking lever 94 will be depressed before the front wheels of the vehicle cross the gap between the ends 30, 32 of the track sections. The depression of the lever 94 in this manner, will urge projection 100 against cam 110 to insure not only that the tracks are locked, but also to cam the tracks into proper alignment. Accordingly, in no case can the tracks be misaligned during the operation of the switch asssembly. In fact, even if all of the pneumatic and electrical equipment in the switch assembly should fail, the cooperation between the cam roller 118 and the ski on the base of the vehicles will always insure that the switch rails are properly aligned. Thus, for example, even if ram 52 should fail in response to a signal from the destination reader, all that would happen is that the tracks would not move and the vehicle would be misdirected, but no derailment would occur. Similarly, if the ram 52 should fail before it reaches the center point of movement, so that the tracks are only partially moved, then when the vehicle approaches the gap between the ends 30, 32 of the track sections, the projection 100 will be depressed against wedge 110, to insure that the tracks are properly aligned. Again, it is possible that the vehicle will be misdirected, but the tracks will always be aligned when a vehicle crosses the gap, thereby insuring that derailment cannot occur. Of course, it is understood that in most cases the tracks will be aligned by operation of ram 52 so the fail safe function of the locking mechanism will simply be a redundant system.

It is noted that the electronic elements of the present invention, including the electronic destination indicator, the destination reader, signal storage memory, electronic presence sensor, and their electrical connection to each other dand to the solenoids which control rams 112 and 52, may take a variety of forms which would occur to those skilled in the art once their function and description has been provided as set forth above. Accordingly, a detailed description of these electrical components and their electrical interconnection to one another need not be provided herein.

Accordingly, it is seen that a fail safe switch assembly for tracked vehicles is provided which is adapted to operate relatively rapidly to switch immediately following vehicles to separate diverging tracks. The system is relatively simple in operation and durable in construction. Moreover, it is adapted to operate with little or no lag time between vehicles, so that the vehicles passing over the switch assembly can be substantially bumper to bumper and still be properly switched, without danger of a derailment. In addition, because the abutting ends of the switch rails move relative to one another with a shearing action, no rocks or foreign objects can become jammed therebetween to prevent proper alignment of the rails.

Although an illustrative embodiment of the present invention has been described herein with reference to the accompanying drawings, it is to be understood that various changes and modifications may be effected therein by one skilled in the art without departing from the scope or spirit of this invention.

What is claimed is:

1. A tracked vehicle switch assembly operatively connected between a single main track and a pair of diverging tracks, said switch asssembly comprising first and second generally longitudinally aligned movable track sections, said first and second track sections having first abutting end portions and second end portions respectively operatively connected to said main track and said pair of diverging tracks, said first track comprising a continuation of said main track and said second track section comprising a continuation of said pair of diverging tracks, means for selectively and simultaneously moving said first abutting ends of said track sections in opposite directions and in substantially the same plane to selectively align said first track section with the tracks of said second track section thereby selectively to direct a vehicle on said main track to either of said diverging tracks; said means for moving said first ends of the track sections including a ram, a lever pivotally mounted intermediate its ends in said assembly and pivotally connected at one end to said ram for movement thereby between two extreme positions, means for pivotally connecting said lever to said first ends of said track sections, on opposite sides of its pivotal mounting, and spring biased toggle means for biasing said lever into the extreme position to which it is moved by said ram, whereby said first ends of the track sections are moved in opposite directions upon actuation of said ram.

2. The switch assembly as defined in claim 1 including flexible coupling means for flexibly connecting said second end portions of said track sections to said main track and said diverging track.

3. The track assembly as defined in claim 2 wherein said first track section comprises a pair of railroad type rails operatively connected by ties and said second track section comprises two pairs of diverging railroad type rails operatively interconnected by ties, and roller means mounted on the ties adjacent said abutting first ends of the track sections for movably supporting said rails.

4. The track assembly as defined in claim 3 including means defining a limited path of travel for said rollers.

5. The track assembly as defined in claim 2 wherein said vehicles each include address means for providing a representation of the vehicle destination, and said assembly includes means for determining a vehicle destination from said address means and for controlling operation of said track section moving means in accordance with said destination.

6. The assembly as defined in claim 5 including means adjacent the abutting ends of said track sections for detecting the presence of a vehicle spanning said track sections, said detecting means preventing operation fo said moving means in response to said vehicle destination determining means until the vehicle previously spanning said abutting track ends has moved completely onto said second track section.

7. The swtich assembly as defined in claim 2 wherein the tracked vehicles each have a ski member suspended therefrom and extending from in front of their front wheels to behind their rear wheels; and a cam roller mounted on said lever in the path of travel of said skis for engagement thereby adjacent the bias of said spring whereby said lever is pivoted by such engagement to engage said projection means with one of said cam surfaces, thereby to cam said track sections into alignment and to prevent movement of said track sections while a vehicle spans said abutting ends of the track sections.

8. A tracked vehicle switch assembly operatively connected between a single main track and a pair of diverging tracks, said switch assembly comprising first and second generally longitudinally aligned movable track sections, said first and second track sections having first abutting end portions and second end portions respectively operatively connected to said main track and said pair of diverging tracks, said first track section comprising a continuation of said main track and said second track section comprising a continuation of said pair of diverging tracks, means for selectively and simultaneously moving said first abutting ends of said track sections in opposite directions and in substantially the same plane to selectively align said first track section with the tracks of said second track section thereby selectively to direct a vehicle on said main track to either of said diverging tracks; and means for locking said first and second track sections in the position to which they are moved by said moving means; said locking means comprising means for providing a pair of oppositely inclined cam surfaces operatively connected to one of said track sections corresponding respectively to the two positions of said track sections, and projection means for selectively engaging said surfaces.

9. A tracked vehicle switch assembly operatively connected between a single main track and a pair of diverging tracks, said switch assembly comprising first and second generally longitudinally aligned movable track sections, said first and second track sections having first abutting end portions and second end portions respectively operatively connected to said main track and said pair of diverging tracks, said first track section comprising a continuation of said main track and said second track section comprising a continuation of said pair of diverging tracks, means for selectively and simultaneously moving said first abutting ends of said track sections in opposite directions and in substantially the same plane to selectively align said first track section with the tracks of said second track section thereby selectively to direct a vehicle on said main track to either of said diverting tracks; means for locking said first and second track sections in the position to which they are moved by said moving means; and means operatively connected to said second track section defining a pair of oppositely inclined cam surfaces, projection means having a V-shaped configuration including surfaces being substantially complementary to the configuration of said cam surfaces and being movably mounted in said assembly, and means for engaging said projection means against one of said cam surfaces when said track sections are moved thereby, to cam said track sections into alignment and to lock said track sections in a relatively fixed position after movement.

10. The switch assembly as defined in claim 9 including means for detecting the presence of a vehicle adjacent the abutting ends of said track sections for holding said projection against one of said cam surfaces at least until the vehicle wheels have passed the abutting ends of the track sections onto said second track section.

11. The switch assembly as defined in claim 10 wherein said means for engaging said projection against said cam surfaces includes a pivotally mounted lever operatively connected at one end to said projection means, a ram operatively connected to the opposite end of said lever for reciprocating said lever, and spring means normally biasing said lever into a position wherein said projection is out of said recess.

12. The switch assembly as defined in claim 11 wherein the tracked vehicles each have a ski member suspended therefrom and extending from in front of their front wheels to behind their rear wheels and said means for detecting the presence of a vehicle adjacent the abutting ends of said track sections comprises a cam roller mounted on said lever in the path of travel of said skis for engagement thereby against the bias of said spring whereby said lever is pivoted by such engagement to engage said projection means against one of said cam surfaces.

13. A tracked vehicle switch assembly operatively connected between a single main track, defined by a pair of railroad-type rails, and a pair of diverging tracks defined by two pairs of diverging railroad-type rails, said assembly being adapted to divert selectively a vehicle moving along said single main track to a selected one of said pair of diverging tracks, the assembly comprising, first and second generally longitudinally aligned movable track sections having first abutting end portions and second opposite end portions, said first track section comprising a pair of parallely extending rails operatively connected to the respective rails of said main track at the second end portions thereof; said second track section comprising two pairs of generally parallely extending rails operatively connected at their second end portions to the respective rails of said pair of diverging tracks; means for selectively and simultaneously moving said first abutting ends of said track sections in opposite directions and in substantially the same plane to selectively align the rails of said first track section with the rails of a selected pair of rails in said second track section, thereby to divert a vehicle traveling along said main track onto the selected pair of rails of said second section and onto one of said pairs of diverging tracks; and means for locking said first and second track sections in the position to which they are moved by said moving means.

14. The track assembly as defined in claim 13 including flexible coupling means for flexibly connecting said rails in said assembly to their associated rails in said main track and said pair of diverging tracks; said means for moving said rails including a ram operatively connected to the abutting ends of said first and second track sections for moving said abutting ends of said sections in opposite directions to selectively align the rails in said first section, at a first position, with one pair of rails in said second section, and to align the rails in said second section, at a second position, with the other pair of rails in said second section.

15. The track assembly as defined in claim 14 wherein the vehicles moving on said main track each include address means for providing a representation of the vehicle destination, said assembly including first detecting means for detecting a vehicle destination from said address means and for controlling said ram to move said first and second track sections to said first and second positions in accordance with the detected destination of the vehicle.

16. The assembly as defined in claim 16 including second detecing means adjacent the abutting ends of said track sections for detecting the presence of a vehicle spanning the abutting ends of said track sections and for preventing operation of said ram in response to said first detecting means until the vehicle spanning said abutting track ends has moved completely onto said second track section.

17. The assembly as defined in claim 16 wherein said rails in said first and second track sections are respectively interconnected by tie members and said locking means comprises means operatively connected to the tie of said second track section for defining a pair of oppositely inclined cam surfaces corresponding respectively to said first and second positions of said track section; projection means having a pair of surfaces respectively conforming substantially to the configuration of said cam surfaces and movably mounted in said assembly, and means for engaging said projection means against a respective one of said cam surfaces when said track is moved into said first and second positions, thereby to lock said track sections in a relatively fixed position; said engaging means being operatively connected to said first and second detecting means for removing said projection means from engagement with a cam surface in response to said first detection means but only after a vehicle spanning said abutting ends of the track sections has moved onto the second track section as determined by said second detecting means thereby to permit said ram to move said track sections in response to said first detecting means.

18. The track assembly as defined in claim 17 wherein said inserting means comprises a lever pivotally mounted in said assembly for movement in a vertical plane and having said projection means mounted at one end thereof; a second ram operatively connected to the opposite end of said lever for reciprocating said lever, and spring means normally biasing said lever into a position wherein said projection is out of said recess.

19. The switch assembly as defined in claim 17 including roller means mounted on the ties adjacent said abutting first ends of the track sections for movably supporting said rails.

20. The switch assembly as defined in claim 17 including support means located in said assembly adjacent the abutting ends of said track sections; a lever pivotally mounted on said support means intermediate its ends and pivotally connected at one end to said ram, and means for pivotally connecting the said lever to the ties of said first and second track sections, on opposite sides of its pivotal mounting on said support means, whereby said first ends of the track sections are moved in opposite directions upon actuation of said ram.

21. The switch assembly as defined in claim 20 including spring biased toggle means for biasing said lever into the extreme position to which it is moved by said ram.

22. A track positioning device for use in a tracked vehicle switch assembly wherein a first track section is moved between two positions with respect to a pair of diverging track sections to selectively direct a vehicle from the first track section to one of said diverging track sections, said positioning device comprising means mounted in said switch assembly for defining a pair of adjacent oppositely inclined cam surfaces corresponding respectively to the two positions of said first track section; projection means having a pair of surfaces whose configurations are respectively complementary to said cam surfaces and movably mounted in said switch assembly and means for engaging said projection means against one of said cam surfaces when said track is moved into one of its two positions, thereby to properly position said first track section with respect to said pair of diverging track sections.

23. The device as defined in claim 22 wherein said inserting means comprises a lever pivotally mounted in said assembly for movement in a vertical plane and having said projection means mounted at one end thereof; a second ram operatively connected to the opposite end of said lever for reciprocating said lever, and spring means normally biasing said lever into a position wherein said projection is out of said recess.

24. The device as defined in claim 23 wherein the tracked vehicles each have a ski member suspended therefrom and extending from in front of their front wheels to behind their rear wheels; and a cam roller mounted on said lever in the path of travel of said skis for engagement thereby adjacent the bias of said spring whereby said lever is pivoted by such engagement to engage said projection means against one of said cam surfaces, thereby to cam said track sections into alignment and to prevent movement of said track sections while a vehicle spans said abutting ends of the track sections.

25. The device as defined in claim 23 wherein said cam surfaces are formed by a generally inverted V-shaped block and define a ridge therebetween, below said projection means, whereby said device will cam said track sections into alignment at each pivotal movement of said lever.

26. A track positioning device for use in a tracked vehicle switch assembly wherein a first track section is moved between two extreme positions with respect to a pair of diverging track sections, said positioning device comprising an inverted V-shaped wedge adapted to be mounted in said switch assembly and defining a pair of oppositely inclined cam surfaces having a thin edge therebetween at the apex of said wedge; locking means having a generally V-shaped configuration including a pair of cam surfaces respectively complementary to the cam surfaces of said wedge, means for movably mounting said locking means into said assembly for movement with respect to said wedge and means for selectively engaging the respective complementary cam surfaces of said wedge and locking means as said track is moved into either of its extreme positions, thereby to cam said track sections into the extreme position to which it is being moved.

27. the track positioning device as defined in claim 26 wherein said selective engaging means includes means on the vehicles traveling along said switch assembly for operatively engaging said locking means and urging the locking means into engagement with said wedge as the vehicle passes over said switch assembly.

* * * * *